Feb. 10, 1925.

T. K. LOWRY ET AL 1,525,682

DEVICE FOR EXTRACTING OR TRANSMITTING HEAT

Filed Jan. 22, 1923   2 Sheets-Sheet 1

Inventors
Thomas K. Lowry
William H. Eichelman
by Otto M. Wirnick
Atty.

Feb. 10, 1925.

T. K. LOWRY ET AL 1,525,682

DEVICE FOR EXTRACTING OR TRANSMITTING HEAT

Filed Jan. 22, 1923     2 Sheets-Sheet 2

Inventors
Thomas K. Lowry
William H. Fichelman
by Otto M. Wirmich
Atty.

Patented Feb. 10, 1925.

1,525,682

UNITED STATES PATENT OFFICE.

THOMAS K. LOWRY AND WILLIAM H. EICHELMAN, OF CHICAGO, ILLINOIS.

DEVICE FOR EXTRACTING OR TRANSMITTING HEAT.

Application filed January 22, 1923. Serial No. 614,102.

*To all whom it may concern:*

Be it known that we, THOMAS K. LOWRY and WILLIAM H. EICHELMAN, citizens of the United States, residing at Chicago, in the county of Cook and State of Illinois, have invented a certain new and useful Improvement in Devices for Extracting or Transmitting Heat, of which the following is a full, clear, concise, and exact description, reference being had to the accompanying drawings, forming a part of this specification.

The invention relates to improvements in devices such as are capable of either extracting or transmitting heat to or from a commodity.

The invention is especially applicable to equipment such as heaters and coolers, evaporators and condensers, boilers, furnaces, dryers, etc.

The invention has as its prime object the provision of a construction which will permit the use of relatively thin gauged material and which will eliminate the necessity of the use of reenforcing bands, stay bolts, etc. which are usually employed for the purpose of affording the necessary strength to resist both the bursting and collapsing pressures to which a structure such as that above referred to is usually subjected, and which will, due to the relatively thin material employed, also augment the transmission or absorption of the heat to and from the commodity to be operated upon.

It is an additional object to provide a construction which readily permits of variation both as to its internal and also its heat transmitting or absorbing capacities.

It is a further feature of the invention to provide a plurality of passages for the heat transmitting and absorbing fluid, and also to employ passages such as above referred to each of which is circular or continuous in outline so that certain paddles which are rotatable relatively to the chamber formed by said passages may be associated therewith and employed to agitate the material to or from which it is desired to transmit or absorb the heat.

In one embodiment of the invention illustrated, the passages above referred to are comprised of a plurality of individual endless pipe sections which are connected together in a manner to permit the heat transmitting or heat absorbing fluid to circulate through and out of said passages.

These endless pipe sections are arranged in close proximity to each other and have their adjacent faces brazed or welded together to thus produce a chamber within which material from which heat is to be extracted or to which heat is to be introduced may be confined during the process of introducing or extracting heat.

The chamber thus formed is closed at its opposite ends and provided with a charging opening and discharge opening, and in addition, is provided with an outlet to permit the escape of the vapors emanating from the commodity confined in the chamber.

A stirrer shaft is arranged longitudinally of the chamber and has secured thereto a plurality of arms which are rotatable with respect to the chamber and provided to stir and subject the commodity to the action of the fluid passing through the coils.

In another embodiment of the invention a pipe section is bent to provide a spiral or continuous coil, the adjacent faces of the coiled portions are brazed together to thus produce a chamber in which the commodity to be operated upon is confined.

The invention will be explained and more readily understood when read in conjunction with the accompanying drawings which illustrate various embodiments of which the invention is susceptible, it being obvious that changes and modifications may be resorted to without departing from the spirit of the appended claims forming a part hereof.

In the drawings, Fig. 1 is a longitudinal elevation, partially in section of the device constructed according to one embodiment of the invention;

Figure 1:
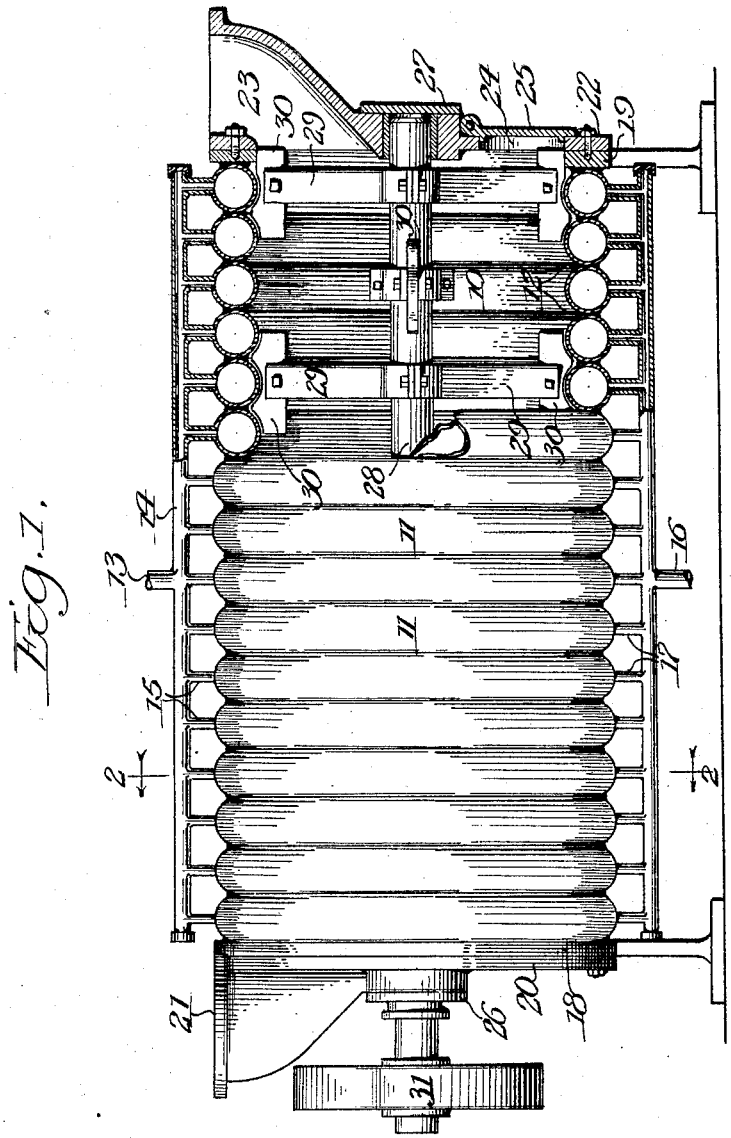
Figure 2:
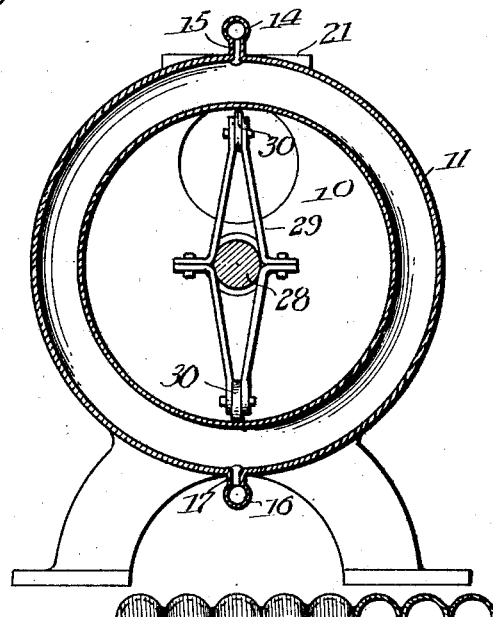
Fig. 2 is a section taken on line 2—2 of Fig. 1.

In the particular embodiment of the invention illustrated in Fig. 1, a chamber generally designated 10 formed of the individual coils 11 is contemplated. These coils 11 are brazed or welded together at their adjacent faces as indicated at 12 to provide a tight and leak-proof connection between the coils.

The coils 11 are preferably formed of a piece of tubing bent to define a circle or any other desired configuration, the adjacent ends of which may be brazed or welded together.

A heat transmitting or absorbing fluid inlet 13 is employed. This inlet is connected to a header 14 having the passages 15 extended therefrom, which communicate with the separate coils 11. A drain 16 is also employed having separate connections 17 each of which leads to or communicates with the interior of one of said coils 11, thus any condensation which takes place within the coils may be readily drained therefrom, or which, in conjunction with the header 14 provides for circulation of an element therethrough.

The opposite ends of the chamber 10 formed by said plurality of coils 11 are respectively provided with the annular members 18 and 19 which are also welded to the endmost coils 11, arranged at the opposite ends of the chamber so formed.

A head 20 is bolted to the annular member 18 and is provided with an inlet opening 21 through which the material may be passed into the interior of the chamber 10 formed by the coils 11.

The opposite end of the chamber 10 is closed by the head 22 which is bolted or otherwise suitably secured to the annular member 19 arranged adjacent this end of the chamber formed by said coils.

The head 22 is provided with the exhaust opening 23 and the discharge opening 24.

The opening 23 is provided to permit the escape of the vapors arising from the material confined within the chamber, the opening 24 permits the material within the chamber to be discharged therefrom.

The opening 24 is provided with a closure or door 25 which prevents the material within the chamber from being discharged therefrom, until so desired.

The heads 20 and 22 are respectively provided with the bearings 26 and 27 for the stirrer shaft 28 the latter of which extends lengthwise of the chamber 10 and carries a plurality of agitating arms 29 which may be provided with the enlarged ends 30 in the form of paddles to stir the commodity confined within the chamber so that a different portion of the entire body of the material will be presented to the action of the medium circulating through the tubular coils 11.

A pulley or other similar element 31 is secured to one end of this shaft 28, for imparting a rotary movement to the shaft and paddles.

Figure 3:
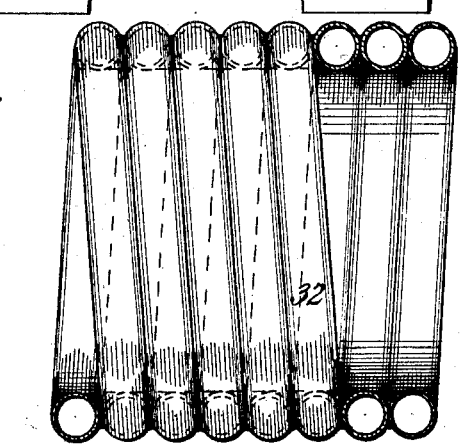
Fig. 3 is a fragmentary longitudinal section of another arrangement which may be employed.

The structure illustrated in Fig. 3 contemplates the use of a chamber constructed of a single piece of tubing which is bent in a spiral to produce the several coils 32.

The adjacent faces of these coils are brazed or otherwise connected together in a manner similar to that described in connection with the structure illustrated in Fig. 1.

From the foregoing description it is evident that an extremely simple construction is provided through which the heat transmitting or absorbing elements may circulate, and that the structure produces an efficient arrangement which may be formed of relatively thin material yet which is sufficiently strong to withstand the bursting and collapsing pressures to which a structure such as this is subjected.

It is further evident that the arrangement of coils readily permits the capacity of the device to be varied by the simple addition or subtraction of coils thereto.

Having thus described the invention what we claim and desire to cover by Letters Patent is:

1. In a device of the character described, the combination of a plurality of annular tubular elements arranged to provide a chamber and an agitator arranged in the chamber for agitating material provided in said chamber.

2. In a device of the character described, the combination of a plurality of separate annular tubular elements connected together to provide a chamber and an agitator arranged in the chamber for agitating material provided in said chamber.

3. In a device of the character described, the combination of a plurality of annular tubular elements arranged to provide a chamber, means for introducing a fluid into said tubular elements, a drain for said tubular elements, means whereby a commodity may be introduced and removed from the interior of the chamber formed by the annular tubular elements, a shaft extending axially of the chamber and means secured to said shaft for agitating the commodity provided in said chamber.

4. In a device of the character described, the combination of a plurality of annular tubular elements arranged to provide a chamber, a header provided to introduce fluid into said tubular elements, a drain for said tubular elements and means for agitating material confined in the chamber formed by said tubular elements.

5. In a machine of the character described, the combination of hollow tubular elements arranged to abut each other and provide a chamber, closures for the opposite ends of the chamber thus formed, means whereby the chamber may be charged with material and means whereby the material may be discharged therefrom, means for introducing a fluid into the hollow tubular elements, and an agitator arranged in said chamber.

6. In an apparatus of the class described, the combination of a plurality of tubular rings abutting one another and arranged in parallel planes transverse to the major axis of the cylinder thus formed, heads secured relatively to the outermost ring at each end of the chamber formed thereby, and an agitator mounted for rotation within said chamber formed by said tubular rings.

7. In an apparatus of the class described, the combination of a plurality of tubular rings abutting one another and arranged in parallel planes transverse to the major axis of the cylinder thus formed, heads secured relatively to the outermost ring at each end of the chamber formed thereby and an agitator mounted for rotation within said chamber formed by said tubular rings, a material inlet opening leading to the interior of the chamber, a material outlet opening leading from the chamber and an exhaust opening also leading from the chamber.

8. In an apparatus of the class described, the combination of a plurality of tubular rings abutting one another and arranged in parallel planes transverse to the major axis of the cylinder thus formed, heads secured relatively to the outermost ring at each end of the chamber formed thereby, each of said tubular rings having a separate fluid inlet and outlet, a material inlet and outlet leading to and from the chamber, and a vapor outlet also leading from the interior of the chamber.

In witness whereof, we hereunto subscribe our names this 27th day of November, A. D. 1922.

THOMAS K. LOWRY.
WILLIAM H. EICHELMAN.